Feb. 2, 1965    K. H. MORITZ ET AL    3,168,386
CATALYZED GASIFICATION OF HYDROCARBONS
TO HYDROGEN AND CARBON MONOXIDE
Filed July 1, 1960
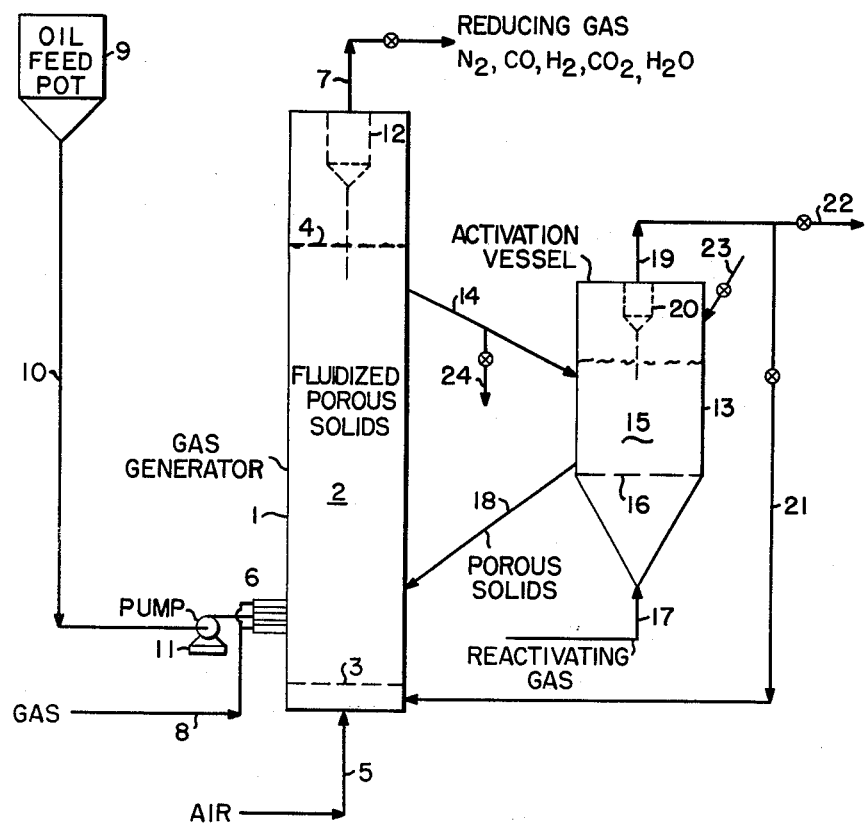
Karsten Herbert Moritz
John Frederick Moser, Jr.   Inventors
Earl Joseph Estopinal, Jr
By  Henry Berk
Patent Attorney United States Patent Office 3,168,386
Patented Feb. 2, 1965

3,168,386
CATALYZED GASIFICATION OF HYDROCAR-
BONS TO HYDROGEN AND CARBON
MONOXIDE
Karsten Herbert Moritz, John Frederick Moser, Jr., and
Earl Joseph Estopinal, Jr., Baton Rouge, La., assignors
to Esso Research and Engineering Company, a corpo-
ration of Delaware
Filed July 1, 1960, Ser. No. 40,261
1 Claim. (Cl. 48—212)

This invention relates to a process for reacting hydrocarbons in a fluidized bed of hot catalytic solids which with resulting coke or carbon deposits are brought into contact with oxygen-containing gas for evolving heat and converting the carbonaceous deposits from the hydrocarbons into carbon monoxide in producing a gas rich in hydrogen and carbon monoxide.

The present invention in its principal features is based on the discovery that porous solids of fluidizable particle size and thermally stable and promote desired gasification reactions which result in preferential formation of $H_2$ and CO by decomposition of hydrocarbons in a fluidized bed of such solids maintained at a suitable gasification temperature by oxidation of carbonaceous deposits from the hydrocarbons so that little or zero net coke is formed.

The porous solids may be selected from a variety of substances such as activated fluid coke, activated carbon, activated charcoal, adsorbent or porous alumina, which may be silica stabilized, calcium alumino-silicates and others which have high porosity.

The methods of activation of the solids to obtain increased porosity by calcining and with use of gases such as air, steam, carbon dioxide and mixtures of such gases are well known. The activation temperatures are usually in the range of 700° to 1600° F., but the temperature depends on the material activated, the time of activation, and activating gas used, these factors being controlled to prevent fusion which results in loss of porosity and surface area and to prevent excessive loss of material from particles heated. For inorganic solid particles, e.g. alumina, especially silica stabilized alumina, the activation temperatures may be higher, e.g. up to 1900° F. Usually the activation is controlled to make the porous solid have a surface area in the range of about 160 to 1200 square meters per gram ($m.^2/g.$) or higher.

The fluidizable particles are of 40 to 300 micron size to form a turbulent dense bed when the fluidizing gas has a linear velocity in the range of 0.5 to 4 ft. per second up through the bed.

For the gasification reaction in which the hydrocarbon feed material, liquid or gaseous, dispersed in the fluidized solids bed, the bed temperatures are in the range of 1750° to 2400° F., preferably 1750° to 2100° F., with a small temperature gradient preferably less than 100° F. throughout the bed.

Pressures in the gasification reaction zone are generally slightly above atmospheric, e.g. 0 to 40 p.s.i.g., but the pressure can be increased.

The hydrocarbon feed should be admitted into the fluidized solids sufficiently above the bottom of the bed, i.e., where the air enters the bed, to avoid direct oxidation of the hydrocarbons by oxygen which causes formation of hot spots that in turn may cause deactivation and results in a fine carbon black formation. Such fine carbon black is less than 1 micron in size generally. Also, the hydrocarbon entrance into the bed should not be too far up toward the top of the bed, but where sufficient time of contact is allowed for the gaseous hydrocarbons from the feed to decompose in the presence of the coke-bearing fluid solids, at a temperature above 1750° F. For example, the hydrocarbons could be made to enter the bed about 1 foot above a grid supporting the bed and through which air is distributed into the bed while a remaining 3 to 10 or more feet of the bed are above the level where the hydrocarbon feed enters. Thus, the turbulently agitated solids receiving carbon and coke deposits undergo sufficient rapid backmixing into contact with the air entering the bottom of the bed to obtain oxidation of such deposits, thus maintaining practically a uniform temperature throughout the bed.

Contrary to earlier expectations, the porous or activated solids have a surprisingly long life in their activity of promoting formation of CO and $H_2$. Some of these, e.g. alumina, showed approximately the same surface area and pore characteristics after a substantial period of use in the gasification zone as they showed originally. Thus, realtively little replenishment by fresh active solids is needed. The carbon and coke fluidizable solids can be reactivated to restore high porosity and surface area.

A reactivator can be used for reactivating solids withdrawn from the gasification zone, and the reactivated solids can be recycled as needed intermittently or continuously to the gasification zone.

In the drawing is illustrated schematically a pilot plant scale reactor serving the purposes of demonstrating operations of the present invention. With the reactor is shown optional equipment for reactivation in a second vessel and other accessories that may be used.

Referring to the drawing, the gas generating vessel 1 contains the fluidized solids bed 2 above grid 3 to the top fluid level 4, receives air from inlet line 5 so that the air is distributed through the grid 3 or equivalent distributing means into the bottom of said bed which receives hydrocarbon feed from inlet injector or nozzle 6 spaced above grid 3. Vessel 1 has a product gas withdrawal line 7 at the top above the bed top level 4.

Gaseous hydrocarbon, e.g. natural gas, is passed to inlet 6 from line 8. In using liquid hydrocarbon, feed is passed from supply pot 9, line 10, and pump 11 to the inlet injector 6. For atomizing the liquid hydrocarbon the injector inlet is a nozzle which may receive simultaneously a suitable atomizing gas, e.g. hydrocarbon gas, inert gas, e.g. $N_2$, or the like, supplied through line 8. Preferably, air or oxygen should not be used in any substantial amount at the nozzle; also, preferably little steam or $CO_2$ would be used in maintaining a good heat balance, i.e. when it is desirable for the gasification of the hydrocarbon to be carried out with a maximum heat developed within the gasification zone.

The product gas, which is to be rich in CO and $H_2$, may be made to pass through a cyclone separator or equivalent means 12 for separating out entrained fine solid particles that would be returned to the bed 2 by a conventional dip leg. Similar or other means for separating such solids may be used outside vessel 1 connected to the off-gas line 7.

In conjunction with the gasification vessel 1, a reactivation vessel 13 may be used. Vessel 13 is assembled and equipped to receive a stream of the solids from bed 2 through a transfer line 14, to hold a bed of the solids in a fluidized bed 15 above the grid 16 up through which reactivating gas is passed from inlet line 17, and to return reactivated solids back to bed 2 by a return line 18. Reactivation product gases, generally containing ingredients such as $CO_2$, CO, $H_2O$, and $H_2$, are withdrawn by line 19 and may be passed through an internal cyclone separator 20 for separating fine solids. Some of this gas may be passed to the gas generator 1 by line 21 as a supplemental gas carrying heat or may be used for atomizing oil feed; otherwise the regenerator off-gas is removed through line 22 and can be used for heat exchange or in some instances as a low grade fuel.

Vessel 13 may be used as an activator to pretreat fresh solids added by line 23, e.g. coke, char, alumina gel, etc. to be activated.

The activation temperatures depend on the activating gas medium. With steam, the temperatures are preferably 1200° to 1600° F. In using air, the temperatures are 600° to 1000° F. Thus, the activation or reactivation in vessel 13 is generally conducted at a lower temperature than the gasification in vessel 1, and is not useful for elevating the gasification temperatures. The activated solids of increased surface area are sent into the gas generator 1 at a rate needed to make up for losses of solids and losses of activity of solids in the vessel 1. When excess solids are present in vessel 1, they can be withdrawn by line 24. As these solids are removed, non-volatile inorganic or ash substances are also removed.

The contact time of the solids undergoing activation or reactivation with activating gas, e.g. steam, air, $CO_2$, or mixed oxidizing gases, varies depending on the temperature. For example, using steam at 1200° F. or 1400° F., this contact time may be over 100 minutes, whereas, at 1600° F. this contact time may be 40 minutes. In using air or oxygen on coke or carbon, the activation is at about 600° to 1000° F., preferably at about 600° to 900° F.

The yield losses in activating coke or char are lower at lower temperatures using air or oxygen, as shown in the following table:

Table 1

EFFECT OF ACTIVATION TEMPERATURE—PETROLEUM COKE ACTIVATED BY AIR OR $O_2$—SURFACE AREA OF FRESH COKE, 5 SQ. METERS PER GRAM

| Activating Gas | Temperature, °F. | Yield, Wt. Percent | Surface Area, m.²/g. |
|---|---|---|---|
| Air | 650 | 93 | 163 |
| $O_2$ | 650 | 90 | 198 |
| Air | 700 | 62 | 339 |

For analytical comparisons, process data were obtained with various solids and temperatures ranging from below 1800° F. to above 2000° F. to determine the effect of surface area of the solids and temeprature on the gas product composition using for gasification natural gas and Bunker-C fuel oil as hydrocarbon feeds. A typical example of the gasification operation used in testing is the following:

EXAMPLE

Using a commercial activated carbon of 60 to 200 mesh size and of 962 m.²/gm. surface area as reactor solids, dry natural gas under 60 p.s.i.g. pressure was passed into a fluidized bed of said activated carbon particles. The natural gas feed was introduced into the bed at about one-fourth the distance between the grid through which air is supplied to the bottom of the bed and the upper level of the dense fluidized bed. The natural gas feed rate was 16–17 standard cubic feet per hour (s.c.f./h.). The air feed rate (at 60 p.s.i.g.) up through the grid was 44 s.c.f./h. for 10 lbs. of solids in the fluidized porous solids bed. The temperature in the bed was maintained by the combustion reaction of air with carbon resulting from decomposition of the hydrocarbons of the natural gas. The exit gas rate from the reactor on a dry basis was close to 60–62 s.c.f./h. The ratio of $O_2$ to C in the feed is close to one-half mole $O_2$ per atom of carbon. Adjustments were made in feed rates and substantial changes can be made in the contact time depending on amount of contact of the gases with carbon and coke bearing particles needed to obtain desired high ratios of $CO/CO_2$ of $H_2/H_2O$ and of hydrocarbon conversion.

The following tabulated data obtained in comparing effects of activated carbon solids with those of low surface area carbon in the gasification zone at 1800° F. using identical input rates of a natural gas feed and air and other conditions comparative.

Table 2

CATALYTIC EFFECT OF SOLIDS SURFACE AREA ON GAS PRODUCT

| Gas Product (Dry Basis) Composition, Mol Percent | Solids and Surface Area | |
|---|---|---|
| | Fluid Coke, 5 m.²/g. | Activated Carbon, 1,000 m.²/g. |
| CO | 6.8 | 14.7 |
| $CO_2$ | 6.8 | 1.3 |
| $H_2$ | 15.5 | 33.0 |
| $CH_4$ | 15.8 | 9.7 |
| $N_2$ | 53.4 | 41.2 |
| $O_2$ | 0.1 | 0.1 |
| (Others by difference) | 1.6 | 1.0 |

The data in Table 2 amply demonstrated that the higher surface area carbon promotes conversion and increased CO and $H_2$ formation.

The comparative data in Table 2 is for a process at partial conversion of the hydrocarbon on account of the low holding time or solids bed depth, but 100% conversions have been shown to be feasible toward obtaining gas products having higher than 15/1 CO to $CO_2$ ratios by deepening the bed so as to give $CO_2$, $H_2O$ and $O_2$ adequate opportunity to react with carbon.

In the representative runs, the gas product for the hydrocarbon gasification processes using high surface area solids was nearly constant during most of the runs, for several hours, indicating no rapid deactivation.

Satisfactory results were obtained with a heavy hydrocarbon oil feed (12.6° API), in some respects surpassing those with a natural gas feed, using activated solids, e.g. activated carbon and porous alumina. In the conversion of the oil with analytical small scale operations, the feed rates of the oil were in the range of 200 to 300 grams per hour and the air feed rates were in the range of 35 to 55 s.c.f./h. with respect to 5 to 12 lbs. of fluidized solids. In some of these runs, the $CO_2$ in the gas product was down below 0.1, the $CO/CO_2$ ratio was far above 30 to 1 even above 200 to 1, and the hydrocarbon was substantially all converted. In a run at 2025° F., the gas product contained 32.9% CO and only 0.21% $CO_2$.

Comparing the effect of porous alumina having a surface area of 190+ m.²/g. with low surface area fluid coke having a surface area of only 5 m.²/g. under comparative conditions (1800° F.) in gasifying heavy fuel oil, the porous alumina made the $CO/CO_2$ ratio more than two times higher and conversion of hydrocarbon (determined by residual $CH_4$ in the product gas) more than two times higher.

Activated coke (air activated at 750° F.) of 200 m.²/g. surface area used as the fluidized solids in conversion of the hydrocarbons showed similarly that with higher surface area solids, the $CO/CO_2$ ratio and hydrogen content of the gas and conversion are improved in comparison to the effect of low surface area solids, e.g. coke of 11 m.²/g. surface area.

By scaling the apparatus and material flow rates upwardly but with the same relationships described, studies have shown that a satisfactory high reducing-power gas having high enough temperature for iron ore or FeO reduction can be made with the present process much more advantageously than with other types of processes. For example, on the basis of converting about 3000 barrels of Bunker-C oil per day sprayed at 250° F. into a bed of fluidized activated coke with 70 million s.c.f./day of air heated by compression to 355° F. entering the bottom of the fluidized bed amounting to 380 tons, enough heat is generated autogenously to maintain the bed at between 1900° F. and 2000° F. throughout. A representative gas product under such conditions would be characterized by the following composition:

Table 3
GAS PRODUCT COMPOSITION, MOL PERCENT

| $H_2$ | $H_2O$ | CO | $CO_2$ | $N_2$ | $H_2S$ |
|---|---|---|---|---|---|
| 21.2 | 1.1 | 25.6 | 0.8 | 50.9 | 0.4 |

Advantageous features of the described process in contrast to other processes which have been described in the prior art for synthesis gas production are as follows:

Low amount of heating and less handling of hot feed materials outside the gasification zone, by using oxygen of compressed air entering the gasification zone to react with carbon deposits rather than hydrocarbons in forming initially the CO and $CO_2$ gases and maintaining the required reaction temperatures.

Low amount of unreacted hydrocarbons and low amount of unreacted residual carbon from the converted hydrocarbons, because the $O_2$ of the air is made to react predominantly with the carbon deposits and does not have the chance of forming hot spots by reacting with the hydrocarbon.

With the hydrocarbon and air feed arrangements described, the hydrocarbon injection zone may function as a temperature moderating zone superadjacent to the bottom zone where the air first contacts carbon and coke deposits in the fluidized porous solids bed.

The porous solids accumulate the coke and carbon deposits in the intermediate zone where the hydrocarbon feed enters the bed and contacts the hot porous solids turbulently moved up from the subadjacent bottom part of the bed. Thus, in this intermediate zone which receives carbon oxide gas (CO and $CO_2$) from the bottom part, the hydrocarbon decomposes to form hydrogen while forming the deposits. Some of the porous solids carry these deposits back into the bottom part for oxidation by oxygen and to develop the heat required, while some of the solids carry these deposits up into the upper part of the bed where the upflowing mixture of gaseous decomposition products are further contacted with said deposits.

Through the rapid circulation of the solids in all directions, i.e. turbulent fluidization, and general upflow of gaseous decomposition products, heat is conducted with sufficient uniformity throughout the entire bed even though heat is generated mainly in the bottom part of the bed where oxygen of the air fluidizing the solids reacts with the carbon and coke deposits on the porous solids. Under these conditions, the porous or adsorbent particles remain unreacted and stable in porosity and in size suitable for fluidization over a period of hours even though these solids are activated carbons or activated coke.

The gas product has proper reducing power for transfer directly into an ore reduction vessel, e.g. a vessel in which FeO particles are to be fluidized and reduced at 1700 to 2000° F. by the hot gas product without intermediate cooling to remove $CO_2$ or $H_2O$. If desired, desulfurizing agents can be contacted with the hot gas maintained at about 1700° F. in being transferred from the gas generator to a metal oxide reducing vessel.

There are several significant factors or features of the present process, which makes use of fluidizable solids activated to high surface area for promoting the gasification reactions which form hydrogen and CO mainly.

The hydrocarbon feed introduced without appreciable amounts of air or oxygen into the cracking zone does not undergo oxidation but rather decomposition to $H_2$ and deposits coke on the activated solids. Thus, the cracking zone reaction does not cause formation of hot spots which lead to fine carbon black formation and deactivation (desurfacing) of the fluidized solids. The liquid hydrocarbon feeds are more prone to form carbon black if the hot spots are present in the cracking zone, and such feeds require heating control provided by the present method. The hydrocarbons may undergo decomposition to lower molecular weight gaseous hydrocarbons and hydrogen with deposition of their carbon constituents on the activated particles. The gaseous hydrocarbon decomposition products further decompose to form $H_2$ and deposits of coke as they are held in contact with the solids at temperatures above 1750° F.

The fluidizable solids activated to a high surface area for promoting the cracking of the hydrocarbon feed receive surface deposits of coke but are circulated from the cracking zone to an adjoining zone where the coke deposits are reacted with oxygen from air introduced in the absence of the hydrocarbon feed. The oxidation of the coke deposits readily produces enough heat to raise the temperature of the solids to a temperature above 1750° F., favoring formation of CO and suitably high for transmitting heat by radiation to the cracking zone in which such heat is absorbed by the cracking reaction.

What is claimed is:

A process for producing a hot gas stream containing principally $N_2$, CO, and $H_2$, which comprises supplying porous alumina particles of 40 to 300 micron size activated to a surface area of 160 to about 1200 square meters per gram and which remain sufficiently stable in size to form a turbulent dense fluidized solids bed, introducing a hydrocarbon feed into a cracking zone of said bed where the hydrocarbon feed is cracked to form $H_2$ and coke deposits on said particles maintained at a temperature in the range of 1750° to 2100° F. by heat radiated and conducted from an adjacent combustion zone, fluidizing said particles carrying coke deposits in said combustion zone by air of which oxygen reacts with said coke deposits to form carbon oxide gases and heat the particles to a temperature in the range of 1750° to 2100° F., wherein said air is introduced into said vessel in such a manner that substantially all of the oxygen of said air is consumed prior to contacting said hydrocarbon, turbulently admixing heated particles fluidized from the combustion zone into said cracking zone, contacting gaseous hydrocarbon and hydrogen from the cracking zone and gases containing CO, $CO_2$, with $N_2$ from the combustion zone at a temperature in the range of 1750° to 2100° F. with coke deposits of upwardly fluidized activated particles from the cracking zone, making said gases richer in CO and $H_2$, and separating a resulting hot gas stream containing mainly $N_2$, CO and $H_2$ with relatively small amounts of $CO_2$, $H_2O$ and gaseous hydrocarbon.

References Cited in the file of this patent

UNITED STATES PATENTS

| 2,390,031 | Schutte et al. | Nov. 27, 1945 |
| 2,445,328 | Keith | July 20, 1948 |
| 2,605,215 | Coghlan | July 29, 1952 |
| 2,642,346 | Keith | June 16, 1953 |
| 2,690,963 | Herbst | Oct. 5, 1954 |
| 2,805,177 | Krebs | Sept. 3, 1957 |
| 2,821,465 | Garbo | Jan. 28, 1958 |
| 2,884,303 | Metrailer | Apr. 28, 1959 |
| 2,885,344 | Garbo | May 5, 1959 |
| 2,994,666 | Hinds | Aug. 1, 1961 |